May 12, 1931.  E. W. EIDEMILLER  1,804,755

DUST CAP FOR PNEUMATIC TIRE VALVES

Filed April 21, 1928

INVENTOR
Earling W Eidemiller
BY
Fred C. Matheny
ATTORNEY

Patented May 12, 1931

1,804,755

UNITED STATES PATENT OFFICE

EARLING W. EIDEMILLER, OF MEDINA, WASHINGTON

DUST CAP FOR PNEUMATIC TIRE VALVES

Application filed April 21, 1928. Serial No. 271,736.

My invention relates to improvements in dust caps for pneumatic tire valves and the object of my invention is to provide a dust cap which is quickly and easily attachable and detachable relative to the valve stem with which it is associated.

Another object is to provide a dust cap of this nature which is yieldingly held in position on the valve stem by resilient spring means so that it will not rattle or become accidentally disengaged from the valve stem.

A more specific object is to provide a dust cap having L shaped bayonet slots that are adapted to engage with locking lugs on a valve stem nut to secure the dust cap in operative position on a valve stem.

Pneumatic tire valves of the form commonly used on motor vehicle tires are ordinarily provided with tubular dust caps to protect the valve stems from the action of dirt and moisture in various forms. These tubular dust caps fit over the valve stems and usually screw onto the valve stem nuts which are threaded onto the valve stems and tightened against the felloe portions of the wheel. These valve stem nuts are usually externally threaded for a substantial distance so that it requires considerable time and trouble to unscrew, and screw on, the dust caps when the tire is tested or further inflated. My present invention obviates the necessity of screwing the dust cap on and off and makes the dust cap very quickly and easily attachable and detachable thus saving much time and trouble and reducing the liability of the dust caps being left off through negligence.

Other and more specific objects will be apparent from the following description taken in connection with the accompanying drawings.

In the drawings, Fig. 1, is a side elevation, on an enlarged scale, of a dust cap constructed in accordance with my invention.

Figure 4:
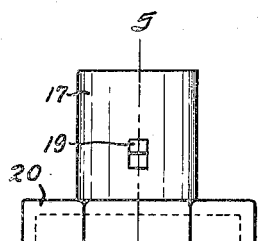

Fig. 4, is a detached view in elevation of the valve stem nut to which the dust cap is secured.

Figure 5:
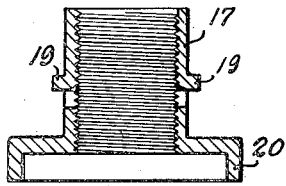

Fig. 5 is a sectional view on broken line 5—5 of Fig. 4.

Figure 6:
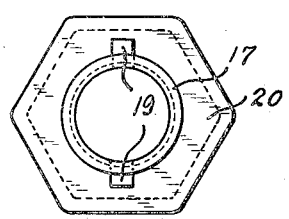

Fig. 6, is a plan view of the valve stem nut.

Figure 1:
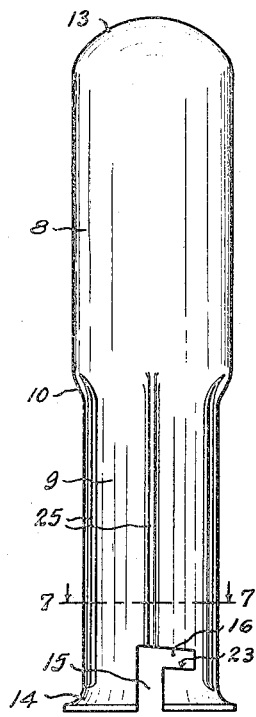
Figure 7:
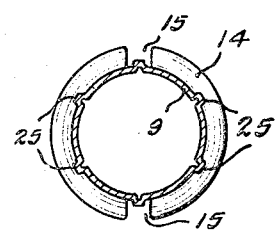

Fig. 7 is a cross section of the dust cap on broken line 7—7 of Fig. 1.

Like reference numerals designate like parts throughout the several views.

Figure 2:
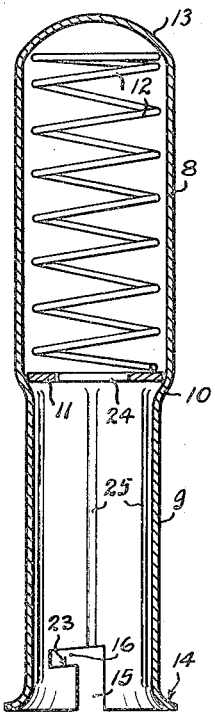
Fig. 2, is a longitudinal mid section of the same.
Figure 3:
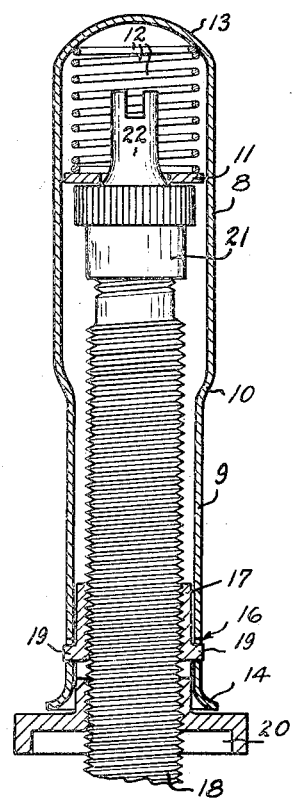
Fig. 3 is longitudinal mid-section of the dust cap and nut for the same as they may appear when applied to a tire valve, therein shown in elevation.

Referring to the drawings, I show a dust cap which may consist of a tube made up of a portion 8 of larger diameter and a portion 9 of smaller diameter. The two portions 8 and 9 are connected with each other by an inclined portion 10 which affords a shoulder whereon a washer 11 may rest. A helical compression spring 12 is disposed within the larger portion 8 of the dust cap with one end resting against the washer 11 and the other end resting against the closed end 13 of said cap. The smaller portion 9 of the dust cap is open at the end and is flared outwardly as at 14, to make the cap easier to put on. Two diametrically opposite L shaped slots 15 extend lengthwise of the tube portion 9 from the open end inwardly for a short distance and thence extend sidewise circumferentially of the tube as at 16. The angle between the general directions of the slot portions 16 and 15 is preferably slightly less than a right angle as shown in Figs 1 and 2.

The slotted end of the dust cap is adapted to fit over a cylindrical valve stem nut 17 which is arranged to screw onto a valve stem 18. The valve stem nut 17 is externally provided with two diametrically opposite locking lugs 19 which are adapted to enter the slots 15 as the dust cap is placed over the nut 17 and to pass into the slot portions 16 when the dust cap is turned after it has been placed on the nut.

The valve stem nut 17 has the usual base 20 adapted to rest on the felloe portion of a wheel.

The smaller section 9 of the dust cap has longitudinally arranged ribs 25 which may be integrally formed in the process of manufacture and which afford convenient finger hold means for facilitating the removal and re-placement of the dust cap.

I have shown two L shaped slots in the dust cap and two locking lugs on the valve stem nut but it is obvious that one or more of said slots and lugs may be used as may be desired.

In applying this dust cap to a valve stem 18 the dust cap is slipped over the end of the stem and the valve cap 21 is caused to engage with the washer 11, the shank 22 on said valve cap projecting up through the central opening 23 of the washer 11. As the dust cap is pressed further over the valve stem the spring 12 is compressed and the bell shaped end of the dust cap guides and directs the same over the end of the valve stem nut 17 until the cap encounters the locking lugs 19, whereupon the dust cap may, if necessary, be turned sufficiently to align the slots 15 with the locking lugs 19 and the dust cap may be pressed against the base 20 of the valve stem nut and turned so as to position the locking lugs within the slot portions 16 and lock the dust cap onto the valve stem. When the cap is on the stem the spring 12 exerts a constant pressure against the top end of the dust cap and maintains a constant tension against the locking lugs 19 thus preventing the several parts from rattling and preventing accidental disengagement of the dust cap. The walls 24 of the slots 16 which are held against the locking lugs 19 are inclined sufficiently so that vibration will not disengage the dust cap from the locking lugs.

While I have illustrated and described my invention as applied to a dust cap for a pneumatic tire valve, it will be understood that this embodiment exemplifies only one form of the invention and that said invention may be embodied in any of numerous other mechanical devices to which it is applicable.

The cap is very quickly and easily removed by exerting a slight twist on the same so as to disengage the cap from the locking lugs 19 and then lifting the cap off of the stem.

This dust cap and the valve stem nut are simple in construction, neat and attractive in appearance, not expensive to manufacture, and afford a combination in which the dust cap is very quickly and easily taken off and put on thereby saving much time and trouble.

The foregoing description and accompanying drawings clearly disclose a preferred embodiment of my invention but it will be understood that this disclosure is merely illustrative and that such changes in the invention may be made as are fairly within the scope and spirit of the following claim.

I claim:

In readily removable dust cap means for a valve stem and cap of a pneumatic tire valve a tubular dust cap embodying two integral cylindrical sections of larger and smaller diameter, an inclined shoulder at the point of connection between the larger and smaller sections, the end of said larger section being closed and the end of said smaller section being open and being expanded to form a bell shaped mouth, said dust cap having L shaped bayonet slots at said open end, the longitudinal portions of said bayonet slots being formed partly in said bell shaped mouth, longitudinally extending ribs formed on the exterior of said smaller section and extending between said inclined shoulder portion and said bell shaped mouth, a circular spring supporting washer movable within said larger section of said tubular cap and arranged to rest on said shoulder portion when the dust cap is removed from the valve stem, a spring operatively disposed within said section of larger diameter and arranged to press against said spring supporting washer and the closed end of the larger section, the spring being compressed when the dust cap is engaged with the valve stem by the valve stem cap engaging and shifting the spring supporting washer, and lugs associated with the valve stem to be received and retained in the bayonet slots.

The foregoing specification signed at Seattle, Wash., this 16 day of April, 1928.

EARLING W. EIDEMILLER.